Aug. 12, 1958 P. L. PAULL 2,847,300
PROCESS FOR RECOVERING METAL VALUES FROM ORE
Filed Nov. 15, 1956 2 Sheets-Sheet 2
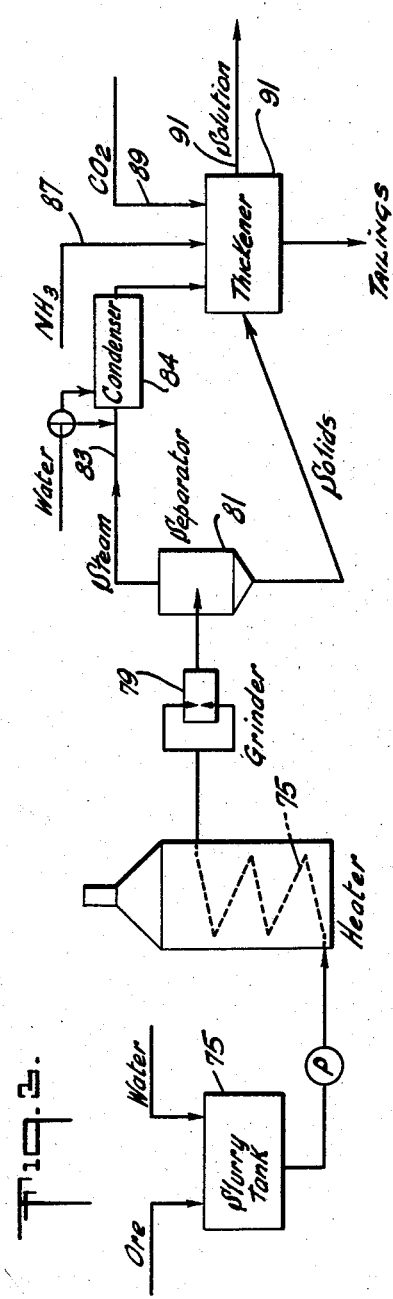
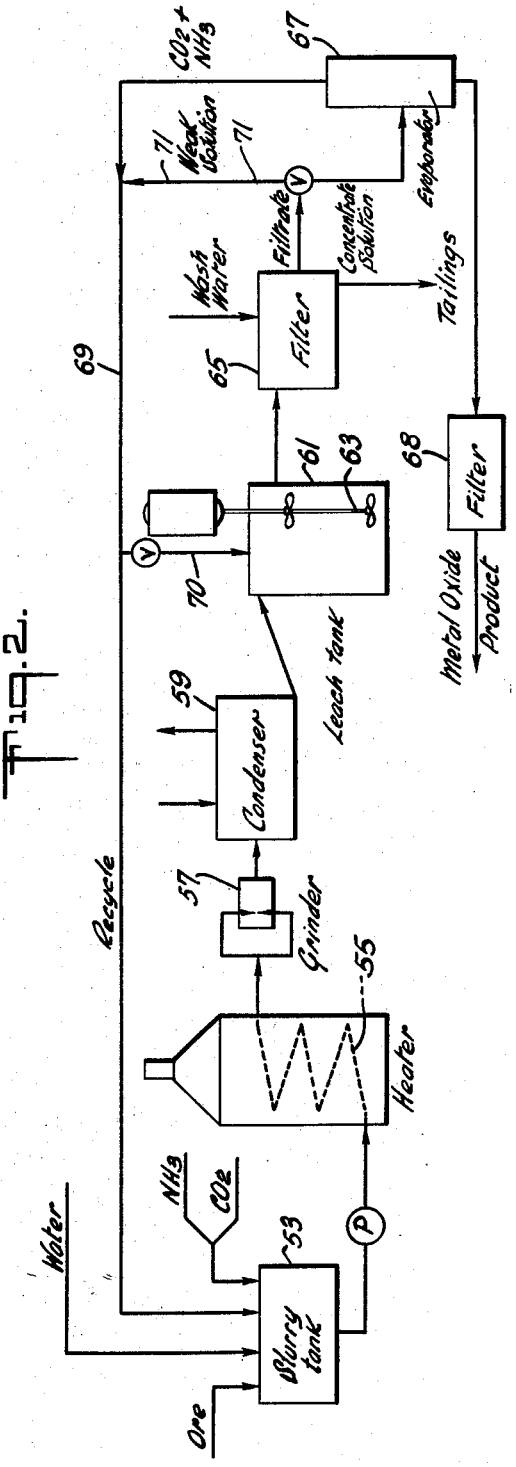

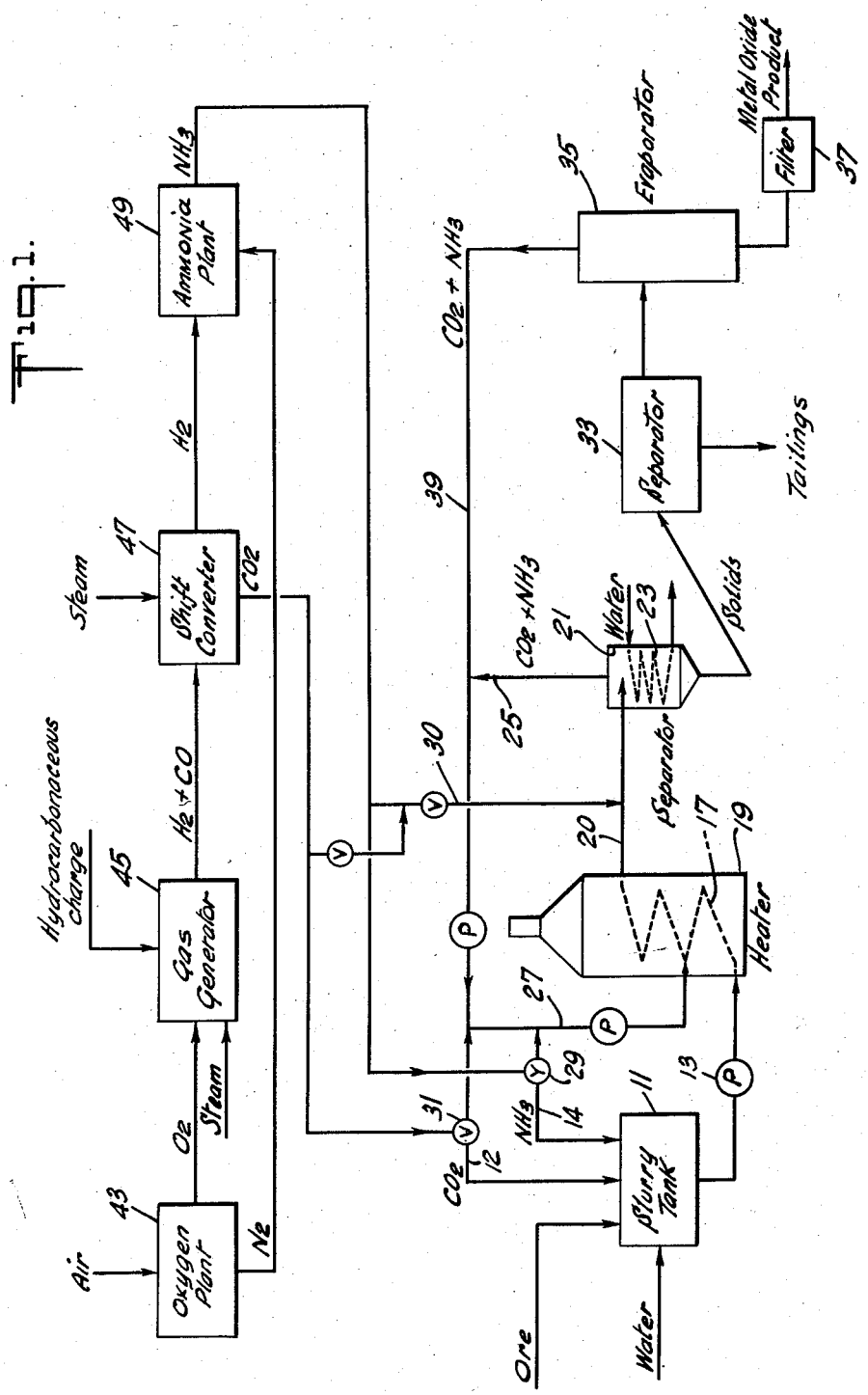

United States Patent Office 2,847,300
Patented Aug. 12, 1958

2,847,300

PROCESS FOR RECOVERING METAL VALUES FROM ORE

Peter L. Paull, Norwalk, Conn., assignor to Texaco Development Corporation, New York, N. Y., a corporation of Delaware Application November 15, 1956, Serial No. 622,374

12 Claims. (Cl. 75—103)

The present invention relates to a novel process for treating ores so as to recover metal values therefrom, and is particularly concerned with the treatment of relatively low grade ores which normally do not lend themselves readily to known concentrating methods.

This application is a continuation-in-part of my application Ser. No. 413,806, filed March 3, 1954.

Millions of tons of low grade ores of such metals as zinc, copper, cobalt, cadmium, lead and nickel are now going unexploited in many of the mining areas of the world for lack of a suitable treating process. For example, oxidic zinc ores such as Smithsonite, hydrozincite and calamine have been difficult to treat because their specific gravity is too low for good gravity separations, nor have they yielded to concentration by flotation. Often all three minerals are simultaneously present in a single ore sample and the zinc from all three must be extracted if a high overall recovery is to be obtained. This has further complicated the chances of making out a successful concentration method.

In accordance with the present invention ores are treated with ammonia and carbon dioxide in the presence of water, and with a concurrent fluid energy grinding action, whereby the metal values are made readily accessible to reaction with the carbon dioxide and ammonia. Water soluble metal complexes are thus formed and become dissolved in the water. The solution is later separated from the leached ore particles or gangue by filtration, decantation or other suitable procedure.

Briefly, the steps of the novel process involve first forming a flowable mixture such as a slurry of relatively coarse particles of ore in water in a mixing zone, then passing the mixture into a confined heating zone and heating the mixture sufficiently to vaporize the water and form a dispersion of the ore particles in steam. These particles are disintegrated to a much finer size by passing the dispersion through a succeeding zone of high velocity flow and subjecting the flowing stream therein to turbulence and a high velocity in excess of 25 feet per second and preferably much higher, such as hundreds or even thousands of feet per second.

Meanwhile, the chemical reaction is effected by introducing ammonia and carbon dioxide into association with the ore in one or both of the mixing and heating zones; thereafter, the dispersion is condensed to form a mixture of leached ore particles in a water solution of the metal complexes formed by reaction of the metal values with the ammonia and carbon dioxide. Separation of the solution from the leached ore particles is then effected, after which it is treated to recover the metal values therefrom.

Instead of introducing the ammonia and carbon dioxide as described above, it is also possible to introduce these gases into association with the ore subsequent to the grinding step, and after reformation of a mixture of ore particles in water by condensation.

My invention is highly advantageous because it is a rapid, economical and continuous operation combining size reduction of the ore with concentration of the desired mineral. Efficiency is particularly high because the process can be operated under elevated pressures favoring the formation of the desired water soluble complexes, while at the same time insuring against unnecessary losses of ammonia and carbon dioxide and reducing the size of the equipment involved.

While the ammonia and carbon dioxide may be obtained from any desired source for performing the process steps outlined above, it is particularly advantageous to obtain these gases by fractionating air into oxygen and nitrogen, partially burning a hydrocarbonaceous material with the oxygen to generate hydrogen and carbon monoxide, generating carbon dioxide and hydrogen by reacting the carbon monoxide with steam, and subsequently reacting the hydrogen with the nitrogen to form ammonia.

In the drawings:

Fig. 1 is a schematic flow diagram showing one arrangement of apparatus for performing the process of the invention, together with apparatus for generating the needed ammonia and carbon dioxide by the partial combustion of a hydro-carbonaceous material;

Fig. 2 is a schematic flow diagram of an arrangement of apparatus for performing a modified form of the process; and Fig. 3 is a schematic flow diagram of still another arrangement of apparatus for performing another modified form of the process wherein the ammonia and the carbon dioxide are introduced subsequent to the grinding operation.

As shown in Fig. 1, ore particles which have been previously crushed to a relatively coarse size, such as to pass through a 14 mesh U. S. Standard sieve, are mixed with water in a pressurized closed slurry tank 11 to form a pumpable slurry. The raito of ore to water may vary considerably but is generally between 1:2 and 2:1 by weight, often being 1:1. Continuous feed of ore particles and water to tank 11 in the selected proportions is advantageous.

Carbon dioxide and ammonia under superatmospheric pressure are also supplied to the tank 11 continuously by conduits 12 and 14 and commence to react with the ore particles.

This slurry is pumped continuously by a pump 13 at a linear velocity of ½ to 10 feet per second into the initial portion of an elongated conduit or tubular zone including a long heater tube 17 located within a heater 19, which may be fired in any desired way, as by oil or gas. Tube 17 can be coiled or in the form of parallel straight tubes connected together by return bends; and the tube may be composed of two or more sections located in several individual heaters.

In the initial portion of tube 17, the slurry is rapidly heated to a temperature above the boiling point of water at the existing pressure and a dispersion of coarse ore particles in steam, carbon dioxide and ammonia is formed. This dispersion passes at a high velocity in excess of 25 feet per second through the latter portion of the tube 17 and continues out of the heater 19 through conduit 20 to a separator 21, such as a centrifugal cyclone separator, which is cooled with water flowing through a coil 23 sufficiently to condense the steam while permitting a portion of the unreacted carbon dioxide and ammonia to pass off the top through a conduit 25 for recovery.

Alternatively or concurrently, mixed carbon dioxide and ammonia may be introduced to coil 17 through a conduit 27 connected to the supply conduits 12 and 14. Suitable vlaves 29 and 31 are provided to control the flow of the gases in any desired way so that all of the gases may be supplied either to the tank 11 or to the pipe coil 17, respectively; or so that the gases may be supplied concurrently to both the tank 11 and coil 17. In addition, mixed carbon dioxide and ammonia may be supplied to conduit 20 through a line 30.

A flowable mixture or slurry of the chemically treated ore in water passes from the bottom of cyclone 21 to a separator 33 such as a conventional filter press or a thickener, from which the water solution of metal complexes is removed and the gangue is discharged.

The water solution then flows to a suitable decomposition system, such as an evaporator 35, wherein the solution is heated sufficiently to decompose the metal complexes and drive off carbon dioxide and ammonia therefrom, leaving behind a body of water containing a precipitate of the resulting metal oxides, carbonates or other insoluble compounds. This mixture then is passed to a filter 37 which discharges the water and recovers the desired metal oxide product as filter cake.

The efficiency of the operation is improved by passing the carbon dioxide and ammonia gases from cyclone 21 and evaporator 35 back into the system through a conduit 39 leading to the conduits 12 and 14.

As mentioned previously the carbon dioxide and ammonia can be obtained from any desired source. However, it is advantageous to employ the system shown in Fig. 1 wherein an air liquefaction plant 43 separates air into its nitrogen and oxygen components. The oxygen flows into a partial combustion gas generator 45 wherein it, with steam reacts with a suitable hydrocarbonaceous charge, such as natural gas or oil to form hydrogen and carbon monoxide. These gases then flow to a shift converter 47 wherein they are contacted with steam which forms more hydrogen and carbon dioxide, the latter then flowing to conduit 12.

The hydrogen flows to an ammonia plant 49 where it reacts catalytically with nitrogen to form ammonia which is then conveyed to conduit 14.

A suitable gas generator 45 is disclosed in U. S. Patent 2,582,938 of Eastman and Gaucher.

Referring now to Fig. 2, there is shown a modification of the invention wherein provision is made for holding the ore in a leaching tank after the grinding has taken place, and for recycling weak solution for use in making up the initial flowable mixture. Water, ore, ammonia and carbon dioxide are supplied to pressurized slurry tank 53, and the resulting slurry is pumped into a heating coil 55 wherein the water is vaporized. Thence the resulting high pressure dispersion of ore particles in gas comprising steam, carbon dioxide and ammonia flows to an opposed nozzle type of grinder 57 wherein two opposed jets of dispersion which may be at an angle of 180° to one another are discharged against one another in a low pressure zone to complete disintegration of the ore particles. The resulting relatively low pressure dispersion then passes through a condenser 59 wherein a slurry is reformed and flows into a leaching tank 61 wherein the slurry is stirred by an agitator 63 to permit the carbon dioxide and ammonia to complete reaction with the metal content of the ore.

From tank 61 the resulting slurry is passed to a filter 65 through which the concentrated water solution of metal complexes flows, while the tailing particles remain behind as filter cake. The concentrated solution then flows to an evaporator 67 as described in connection with Fig. 1. The metal complexes are decomposed to the oxide form which is then filtered out at 68, while the resulting carbon dioxide and ammonia pass off the top and back to the slurry tank 53 by a conduit 69. Part of the recycle ammonia and carbon dioxide also may be topped off to the leach tank 61 by a conduit 70.

The cake in filter 65 is washed with water and the resulting weak solution of metal complexes in water is directed through a conduit 71 into the recycle conduit 69 for return to slurry tank 53. Upon completion of the washing operation the filter cake is discharged from the filter, which is then ready to resume operations for filtering leached slurry.

Continuous operation is assured by employing two or more filter presses so that one is always on stream while another is being washed and cleared of filter cake, or a continuous rotary filter may be used.

In the third modification of the invention, as shown in Fig. 3, a slurry of ore and water is made up in a tank 75 without introducing ammonia and carbon dioxide. This slurry is pumped through a heater coil 77 and the resulting dispersion passes through an opposed nozzle grinder 79 and thence to a separator 81 such as a centrifugal cyclone. Steam passes off the top through a conduit 83 and cooling water is introduced into the conduit to cool and condense the steam, after which the resulting water flows into a thickener 85. Alternatively or concurrently, indirect heat exchange in a condenser 84 may be used where too large a volume of liquid results from direct mixing.

Meanwhile, the solids consisting of very finely divided ore particles, pass from the bottom of separator 81 into the thickener 85 and a thin slurry of ore particles in water is formed. Into this slurry ammonia and carbon dioxide are introduced through conduits 87 and 89 to react with the metal constituents of the ore particles and form water soluble complexes. The leached tailings are discharged from the bottom of the thickener while the water solution of metal complexes leaves through a conduit 91 for subsequent recovery of the metal values as described previously.

*Example I*

One hundred tons of the copper ore malachite containing 3% by weight of copper is fed along with 24,000 gallons of water to slurry tank 11, the malachite ore having previously been crushed so that 50% passes through a 200 mesh screen and 95% passes through a 40 mesh screen, U. S. Standard. To this slurry are added 13,000 pounds of gaseous ammonia and 4500 pounds of gaseous $CO_2$. This mixture is continuously stirred and charged at a rate of 935 pounds per hour and a pressure of 505 pounds per square inch into a 400 foot long coil of ½ inch extra heavy iron pipe contained in a gas fired heater. In this coil the mixture of ore, water and gases is heated up to a temperature of 685° F. to form a steam dispersion which progresses through the coil and then passes at high velocity through a pair of opposed nozzles having 5/32 inch bores so that pulverization of the ore is effected. As the ore passes through the coil and is pulverized, the ammonia and carbon dioxide gases react with its basic copper carbonate content to form a water soluble copper-ammonia complex. It is thought that the complex reaction follows the following equation:

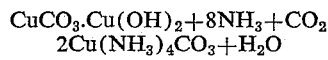

$$CuCO_3 \cdot Cu(OH)_2 + 8NH_3 + CO_2$$
$$2Cu(NH_3)_4CO_3 + H_2O$$

The dispersion of solids in steam and excess ammonia and $CO_2$ gases pass to a water cooled separator 23 wherein the temperature is reduced sufficiently to condense the steam. The copper ammonia complex, being water soluble, is dissolved by the steam condensate which is withdrawn along with unconverted solids from the bottom of the separator. Most of the unreacted $CO_2$ and ammonia are separated overhead from this separator and recycled back to the slurry tank.

The slurry of the unconverted solids, principally gangue containing small amounts of unconverted malachite, is directed to a rotary filter 33 wherein the water containing copper ammonia complex is separated as filtrate from the gangue which is discarded as filter cake. The copper ammonia complex solution is then directed to evaporator 35 where it is heated under pressure to a temperature of 340° F. to decompose the copper ammonia complex, producing a mixture of copper oxide, copper carbonate and basic copper carbonate, and gaseous ammonia and $CO_2$. The copper compounds, being insoluble in water, are withdrawn with the water as a slurry, and the ammonia and $CO_2$ gases are discharged overhead back to the slurry tank.

Copper compounds are separated from the slurry by filtration. A total of 5400 pounds of copper in the the form of the aforementioned compounds are produced, which can be subsequently refined for the production of metallic copper if desired; and there is a net consumption of 700 pounds of ammonia and 500 pounds of $CO_2$.

The ammonia and $CO_2$ used in the foregoing ore beneficiation operation are produced in gas generator 45 by the partial combustion with pure oxygen of a Bunker C fuel oil of 14.9 gravity and 106 seconds Saybolt-Furol viscosity at 122° F. In this operation air is rectified in column 43 to produce high purity oxygen and nitrogen. The high purity oxygen, at a rate of 16,700 cubic feet per hour, is reacted with 168 gallons per hour, of the fuel oil and 680 pounds per hour of steam in a synthesis gas generator at 2500° F. and 350 p. s. i. g. to produce a synthesis gas comprising predominantly CO and hydrogen, with small amounts of $CO_2$ and water vapor.

This synthesis gas is reacted in converter 47 with additional steam over an iron type catalyst at a temperature of 700° F. and 350 p. s. i. g. to convert the CO to $CO_2$ and generate additional hydrogen by the water gas shift reaction wherein one mol of water combines with one mole of CO to produce one mol of hydrogen and one mol of $CO_2$. The resulting gas, comprising hydrogen and 3000 pounds per hour of $CO_2$, is subjected to a scrubbing operation with monoethanolamine to remove the $CO_2$ and yield a pure hydrogen stream. The $CO_2$ is subsequently separated from the monoethanolamine by heating and used to conduct the ore beneficiation operation.

The high purity hydrogen stream is then mixed in a ratio of three mols of hydrogen to one mol of the nitrogen produced in the aforementioned air rectification plant, and the mixture converted to ammonia in a conventional ammonia synthesis unit. 1850 pounds of pure ammonia per hour are produced for use in the ore beneficiation process.

The excess $CO_2$ and $NH_3$ generated are available for other chemical uses.

*Example II*

A low grade zinc ore containing 4.21% Smithsonite is crushed to 14 mesh in size and then mixed with water in proportions of one ton of ore to 240 gallons of water. The resulting slurry is pumped at 505 pounds per square inch through 400 feet of ½ inch extra heavy iron pipe to an opposed nozzle grinder having 5/32 inch orifices at a rate of 935 pounds per hour. The temperature at the outlet of the pipe is 900° F. and the pressure downstream of the opposed nozzles is 32 pounds per square inch.

The resulting ore particles, substantially all of which are finer than 325 mesh, are then extracted countercurrently in a thickener 85 with water containing 7 pounds of ammonia and 1 pound of carbon dioxide per gallon.

The extract after separation from the gangue is heated, whereupon a hydrous zinc carbonate is precipitated and recovered in the amount of 71 pounds per ton of ore fed to the process. The product analyzes about 57% zinc and represents a recovery of about 41 pounds or 93% of the zinc from the ore.

Obviously, many modifications and variations of the invention, as hereinbefore set forth, may be made without departing from the spirit and scope thereof, and therefore only such limitations should be imposed as are indicated in the appended claims.

I claim:

1. A process for recovering metal values from an ore comprising a metal which forms water soluble complexes with carbon dioxide and ammonia, said process comprising forming a flowable mixture of particles of said ore in water in a mixing zone; passing said mixture into a confined heating zone; heating said mixture in said heating zone sufficiently to vaporize said water thereby forming therein a dispersion of said particles in steam; disintegrating said particles of ore to a finer size by passing said dispersion through a succeeding zone of high velocity flow and subjecting the flowing stream therein to turbulence and a high velocity; introducing ammonia and carbon dioxide into association with said ore in at least one of said zones; condensing said dispersion and forming a mixture of ore particles in a water solution of the metal complexes formed by reaction with said ammonia and carbon dioxide; and separating said solution from said ore particles.

2. A process in accordance with claim 1 wherein said ammonia and carbon dioxide are introduced into association with said ore during formation of said flowable mixture in said mixing zone.

3. A process in accordance with claim 1 wherein said ammonia and carbon dioxide are introduced into said heating zone.

4. A process in accordance with claim 1, also comprising the step of separating excess carbon dioxide and ammonia from said dispersion before condensation thereof; and recycling the separated carbon dioxide and ammonia into association with said ore particles.

5. A process in accordance with claim 1, also comprising the additional step of decomposing the metal complexes in said solution to liberate carbon dioxide and ammonia therefrom; and recycling said ammonia and carbon dioxide thus liberated into association with said ore particles.

6. A process in accordance with claim 1, also comprising maintaining both said flowable mixture and dispersion under superatmospheric pressure to expedite the reaction of said ammonia and carbon dioxide with said ore.

7. A process in accordance with claim 1, also comprising fractionating air into oxygen and nitrogen; generating said ammonia by partial combustion of a hydrocarbonaceous material with said oxygen to generate hydrogen and carbon monoxide, and subsequently reacting said hydrogen with said nitrogen; and generating said carbon dioxide by reacting said carbon monoxide with steam to to form hydrogen and carbon dioxide, said last-named hydrogen subsequently also being reacted with said nitrogen to form said ammonia.

8. A process in accordance with claim 1, also comprising condensing said dispersion to form a mixture of said ore in water; and maintaining said ore particles in contact with said water for a time sufficient to dissolve said metal complexes in said water.

9. A process in accordance with claim 1 also comprising forming said flowing dispersion into at least two streams; and discharging said streams against one another so that said particles impinge against one another and are disintegrated.

10. A process in accordance with claim 1, wherein said solution is separated from the leached ore particles by filtration; said process also comprising washing the filter cake with water thereby forming a weak solution of said metal complexes; and recycling said weak solution into said mixing zone for making up said flowable mixture.

11. A process for recovering metal values from an ore comprising a metal which forms water soluble complexes with ammonia and carbon dioxide, said process comprising forming a flowable mixture of particles of said ore in water; passing said mixture into a confined heating zone; heating said mixture in said zone sufficiently to vaporize said water, thereby forming therein a dispersion of said particles in steam; disintegrating said particles of ore to relatively fine particles by passing said dispersion through a succeeding zone of high velocity flow and subjecting the flowing stream therein to turbulence and a high velocity; condensing said dispersion and forming a mixture of said fine ore particles in water; introducing ammonia and carbon dioxide under superatmospheric pressure into association with said condensed mixture, to react with the metal content of said ore and form soluble complexes which dissolve in the water content of the mixture; and separating the resulting solution from the ore particles.

12. A process in accordance with claim 11, wherein prior to said condensation, the steam of said dispersion is separated from the solid content thereof; wherein said separated steam is condensed; and wherein said condensed steam and said separated fine particles are recombined to form said mixture to be treated with said ammonia and carbon dioxide.

References Cited in the file of this patent

UNITED STATES PATENTS

| | | |
|---|---|---|
| 1,058,313 | Luckenbach | Apr. 8, 1913 |
| 1,570,858 | Perkins | Jan. 26, 1926 |